United States Patent
Blumberg

(10) Patent No.: US 12,540,926 B2
(45) Date of Patent: Feb. 3, 2026

(54) SPLIT FLOW MODULATOR FOR COMPREHENSIVE TWO-DIMENSIONAL CHROMATOGRAPHY

(71) Applicant: LECO Corporation, St. Joseph, MI (US)

(72) Inventor: Leonid M. Blumberg, Wilmington, DE (US)

(73) Assignee: LECO Corporation, St. Joseph, MI (US)

( * ) Notice: Subject to any disclaimer, the term of this patent is extended or adjusted under 35 U.S.C. 154(b) by 788 days.

(21) Appl. No.: 17/904,003

(22) PCT Filed: Feb. 23, 2021

(86) PCT No.: PCT/US2021/019186
§ 371 (c)(1),
(2) Date: Aug. 10, 2022

(87) PCT Pub. No.: WO2021/173525
PCT Pub. Date: Sep. 2, 2021

(65) Prior Publication Data
US 2023/0090089 A1 Mar. 23, 2023

Related U.S. Application Data

(60) Provisional application No. 62/980,752, filed on Feb. 24, 2020.

(51) Int. Cl.
*G01N 30/46* (2006.01)
(52) U.S. Cl.
CPC ......... *G01N 30/463* (2013.01); *G01N 30/465* (2013.01)

(58) Field of Classification Search
CPC ........ G01N 30/02; G01N 30/10; G01N 30/46; B01D 15/16
See application file for complete search history.

(56) References Cited

U.S. PATENT DOCUMENTS

| 5,379,269 A | 1/1995 | Sindeband et al. |
| 6,547,852 B2 | 4/2003 | Ledford, Jr. et al. |
| | (Continued) | |

FOREIGN PATENT DOCUMENTS

| GB | 1314013 A | 4/1973 |
| JP | 1999024694 | 1/1999 |
| | (Continued) | |

OTHER PUBLICATIONS

Japanese Patent Office, Office Action for Application No. 2022-547177 dated Nov. 2, 2023.
(Continued)

*Primary Examiner* — Sharon Pregler
(74) *Attorney, Agent, or Firm* — Honigman LLP; Grant Griffith; Thomas Appledorn

(57) ABSTRACT

A re-sampling device for two-dimensional gas chromatography includes a modulator and at least one of a first splitter disposed upstream from the modulator and configured to split an effluent from a primary column and deliver a portion of the effluent to waste and a portion of the effluent to the modulator, or a second splitter disposed downstream from the modulator and configured to split the effluent to deliver a portion of the effluent to waste and a portion of the effluent to a secondary column.

18 Claims, 12 Drawing Sheets

(56) References Cited

U.S. PATENT DOCUMENTS

| | | | |
|---|---|---|---|
| 6,794,148 B2* | 9/2004 | Jindal | G01N 30/461 |
| | | | 435/7.1 |
| 7,383,718 B2 | 6/2008 | McCurry et al. | |
| 7,601,543 B2 | 10/2009 | Cai et al. | |
| 7,779,670 B2 | 8/2010 | Wang | |
| 7,823,439 B2 | 11/2010 | Fisher | |
| 2002/0148353 A1 | 10/2002 | Seeley | |
| 2002/0150926 A1 | 10/2002 | Jindal et al. | |
| 2011/0186511 A1 | 8/2011 | Sakai et al. | |
| 2014/0060151 A1 | 3/2014 | Gellert | |
| 2016/0375376 A1 | 12/2016 | Wikfors | |
| 2018/0095060 A1 | 4/2018 | Fan et al. | |

FOREIGN PATENT DOCUMENTS

| | | |
|---|---|---|
| JP | 2009530611 A | 8/2009 |
| KR | 102056580 B1 | 12/2019 |

OTHER PUBLICATIONS

Tranchida, P.Q. et al., Generation of Improved Gas Linear Velocities in a Comprehensive Two-Dimensional Gas Chromatography System, Analytical Chemistry, Mar. 15, 2007, vol. 79/No. 6, p. 2266-2275.

Nobuo Ochiai, Principle of Comprehensive Two-Dimensional Gas Chromatography (GCxGC) and Application thereof to Environmental Analysis, Environmental Technology, Vo. 34/No. 11, 2005, p. 801-805.

Bieri, S. and Marriott, P.J., Dual-Injection System with Multiple Injections for Determining Bidimensional Retention Indexes in Comprehensive Two-Dimensional Gas Chromatography, Analytical chemistry, Feb. 1, 2008, vol. 80/ No. 3, p. 760-768.

Tranchida, P.Q. et al., Measurement of fundamental chromatography parameters in conventional and split-flow comprehensive two-dimensional gas chromatography-mass spectrometry: A focus on the important of second- dimension injection efficiency, Journal of separation science, 2013, Vo. 36/No. 1, p. 212-218.

UK Intellectual Property Office, Examination Report for Application GB2211359.1 dated Feb. 12, 2024.

J. B. Phillips, R. B. Gaines, B. Jan, F. W. M. van der Wielen, J.-M. D. Dimandja, V. Green, J. Granger, P. Don, L. Racovalis, H.-J. de Geus, J. de Boer, P. Haglund, J. Lipsky, V. Shinha, E. B. Ledford, A Robust Thermal Modulator for Comprehensive Two-Dimensional Gas Chromatography, J. High. Resolut. Chromatogr. 22 (1999) 3-10.

J. V. Seeley, F. Kramp, C. J. Hicks, Comprehensive Two-Dimensional Gas Chromatography via Differential Flow Modulation, Anal. Chem. 72 (2000) 4346-4352.

M. M. Bushey, J. W. Jorgenson, Automated Instrumentation for Comprehensive Two-Dimensional High-Performance Liquid Chromatography of Proteins, Anal. Chem. 62 (1990) 161-167.

P. J. Marriott, R. M. Kinghorn, Longitudinal Modulated Cryogenic System. A Generally Applicable Approach to Solute Trapping and Mobilization in Gas Chromatography, Anal. Chem. 69 (1997) 2582-2588.

P. Q. Tranchida, G. Purcaro, A. Visco, L. Conte, P. Dugo, P. Dawes, L. Mondello, A flexible loop-type flow modulator for comprehensive two-dimensional gas chromatography, J. Chromatogr. A 1218 (2011) 3140-3145.

J. V. Seeley, N. J. Micyus, S. V. Bandurski, S. K. Seeley, J. D. McCurry, Microfluidic Deans Switch for Comprehensive Two-Dimensional Gas Chromatography, Anal. Chem. 79 (2007) 1840-1847.

J. V. Seeley, N. E. Schimmel, S. K. Seeley, The multi-mode modulator: A versatile fluidic device two-dimensional gas chromatography, J. Chromatogr. A 1536 (2018) 6-15.

C. A. Bruckner, B. J. Prazen, R. E. Synovec, Comprehensive Two-Dimensional High-Speed Gas Chromatography with Chemometric Analysis, Anal. Chem. 70 (1998) 2796-2804.

L. M. Blumberg, Accumulating Resampling (Modulation) in Comprehensive Two-Dimensional GC (GCxGC), J. Sep. Sci. 31 (2008) 3358-3365.

Peter Quinto Tranchida, Giorgia Purcaro, Paola Dugo, Luigi Mondello, Modulators for comprehensive two-dimensional gas chromatography, 4202 Trends in Analytical Chemistry, vol. 30, No. 9, 2011.

Matthew Edwards, Ahmed Mostafa, Tadeusz Górecki, Modulation in comprehensive two-dimensional gas chromatography: 20 years of innovation, 3424 Analytical and Bioanalytical Chemistry <https://link.springer.com/journal/216>, Nov. 2011, vol. 401, Issue 8 <https://link.springer.com/journal/216/401/8/page/1>, pp. 2335-2349.

Jacolin A. Murray, Qualitative and quantitative approaches in comprehensive two-dimensional gas chromatography, 3677 Journal of Chromatography A, 1261 (2012) 58-68.

John V. Seeley, Recent advances in flow-controlled multidimensional gas chromatography, 4204 Journal of Chromatography A, 1255 (2012) 24-37.

John V. Seeley, Frederick J. Kramp, Kristopher S. Sharpe, A dual-secondary column comprehensive two-dimensional gas chromatograph for the analysis of volatile organic compound mixtures, 827 J. Sep. Sci. 20001, 24, 444-450.

John V. Seeley, Stacy K. Seeley, Multidimensional Gas Chromatography: Fundamental Advances and New Applications, 3746 Anal. Chem. 2013, 85, 557-578.

Peter Q. Tranchida, 1 Flavio A. Franchina, 1 Paola Dugo, 1,2,3 and Luigi Mondello1,2,3, Comprehensive Two-Dimensional Gas Chromatography-Mass Spectrometry: Recent Evolution and Current Trends, 4063 Mass Spectrometry Reviews, 2014, XX, 1-11.

Peter Q. Tranchida, Review article Comprehensive two-dimensional gas chromatography: A perspective on processes of modulation, 4462 Journal of Chromatography A, 1536 (2018) 2-5.

Pedro A. Bueno Jr., John V. Seeley, Flow-switching device for comprehensive two-dimensional gas chromatography, Journal of Chromatography A, 1027 (2004), 3-10.

J.V. Seeley, Flow-modulated comprehensive two-dimensional gas chromatography, in L. Mondello (Editor), Comprehensive Chromatography in Combination with Mass Spectrometry, Wiley, Hoboken, NJ, 2011, 145-170.

International Search Report and Written Opinion for Application PCT/US2021/019186 dated Jun. 11, 2021.

International Preliminary Report on Patentability and Written Report for Application No. PCT/US2021/019186 Dated Aug. 9, 2022.

\* cited by examiner

SPLIT FLOW MODULATOR FOR COMPREHENSIVE TWO-DIMENSIONAL CHROMATOGRAPHY

CROSS REFERENCE TO RELATED APPLICATIONS

This U.S. patent application is a national phase application of, and claims priority under 35 U.S.C. § 371 from, International Application PCT/US2021/019186, filed on Feb. 23, 2021, which claims priority to U.S. Provisional Application 62/980,752, filed on Feb. 24, 2020. The disclosures of these prior applications are considered part of the disclosure of this application and are hereby incorporated by reference in their entireties.

TECHNICAL FIELD

This disclosure relates to split flow modulators for comprehensive two-dimensional chromatography.

BACKGROUND

Gas chromatography (GC) is generally used to characterize complex mixtures of volatile organic compounds (VOCs), which can be key components in industrial, environmental, medical, and other samples. The separating power of GC analysis can be expressed via the number of components that can be separated and identified in a certain time. Increasing the separating power of conventional GC requires a disproportionally large increase in analysis time. Comprehensive two-dimensional gas chromatography (GC×GC) is a way of substantially increasing (e.g., by more than a factor of 10) the separating power of GC without increasing the analysis time.

GC-MS instruments (GC with mass spectrometer as a detector) use gas chromatography to separate mixtures into individual components and mass spectrometry to detect and identify each component. Chromatographic separation is the rate-limiting step: complex samples often require more than 30 minutes to resolve (quantifiably and identifiably separate). Chromatography is an analytical method for the separation and identification of chemical compounds from mixtures. The combination of gas chromatography with quantitative instrumentation, e.g., GC-IR (GC with an infrared spectrometer as a detector), GC-UV (GC with an ultraviolet spectrometer as a detector), and GC-MS, may provide reliable results, and combining comprehensive two-dimensional gas chromatography (GC×GC) with these techniques may further increase their separating power.

In comprehensive multi-dimensional column chromatography such as GC×GC, LC×LC (liquid chromatography), etc., modulation (also known as sampling and resampling) is a process of dividing the analysis time in small sub-intervals—the modulation periods, or sampling periods—typically of equal duration, and sending, during each period, all or a fraction of the effluent or eluite of the primary column into the secondary column as narrow reinjection pulses having a duration typically substantially shorter than the sampling period. The devices performing this operation are known as modulators or resamplers. The term "effluent" is understood to mean both a carrier gas and an analyte eluting from a column outlet. The term "eluite" is understood to mean the analyte in the effluent.

GC×GC modulators are distinguishable by their design principles and functionality. Thermal modulation and flow modulation are common design principles. Two types of functionality of GC×GC modulation can be recognized: (i) snapshot or duty-cycle modulation and (ii) full transfer modulation. A snapshot flow modulator transfers a fraction of the primary effluent to the secondary column during a short fraction of the modulation period. During the remaining portion of the modulation period, the primary effluent goes to waste. The full transfer flow modulator accumulates the entire primary effluent in an accumulating loop (also known as the sample loop) and, at the end of the accumulation, transfers the entire content of the accumulating loop into the secondary column. A full transfer thermal modulation works in a similar way, but it accumulates in the accumulating loop only the primary eluite while the carrier gas eluting from the primary column flows through the accumulating loop. Snapshot modulation may have several disadvantages.

Snapshot modulation may not transfer a consistent fraction of the primary eluite to the secondary column. The transferred fraction of the eluite depends on the sampling phase—the time difference between the maximum concentration of the primary eluite and beginning of the transfer of the eluite into the secondary column—that can vary from run to run.

In snapshot modulation, the sharpness of the reinjection pulse depends on the timing of starting and ending the sampling of the primary effluent. As the transitions from one state to another cannot be instantaneous, they limit the sharpness of the reinjection pulses and can cause incomplete effluent transfer even during the time of its transfer.

In snapshot modulation, the fact that only a fraction of the primary eluite is transferred into the secondary column can substantially reduce detectability of low concentration analytes. This is especially harmful when only a small sample amount is available. Otherwise, the eluite lost in the modulation can be partially compensated by increasing the sample amount injected in the primary column.

Full transfer modulation may not include the aforementioned disadvantages of snapshot modulation. However, full transfer modulation may have different disadvantages. In order for the reinjection time (the width of the reinjection pulse) to be much shorter than the modulation period, it may be necessary to have an auxiliary gas supply that can supply much larger (10 to 100 times larger) gas flow than the primary flow. This leads to several shortcomings: high gas consumption, the secondary column operating at a high flow rate (above its chromatographic optimum), and wide reinjection widths which depend on the ratio of primary column flow to secondary column flow and the length of the modulation period (typical full transfer modulation may have reinjections significantly wider than optimal).

Full transfer modulation is a sub-class of representative modulation. Similar to full transfer modulation, representative modulation accumulates during each modulation period the entire primary column eluite (effluent in the case of flow modulation), but directs to the secondary column only a representative fraction of the accumulated eluite. In the case of the full transfer modulation, that fraction is 100%.

Representative modulation implemented as a full transfer modulation with flow splitters may address some of the shortcomings of full transfer modulation. For example, by splitting the primary effluent by a pre-splitter and directing only a fraction of the primary effluent to the full-transfer modulator and/or splitting the effluent of the full-transfer modulator by a post-splitter and directing only a fraction of the effluent of full-transfer modulator to the secondary column, some of the aforementioned deficiencies of the full transfer modulation may be substantially avoided.

This section provides background information related to the present disclosure which is not necessarily prior art.

SUMMARY

One aspect of the disclosure provides a device for two-dimensional gas chromatography comprising a primary column, a secondary column downstream from the primary column, and a re-sampling device disposed between the primary column and the secondary column. The re-sampling device includes a modulator and at least one of (i) a first splitter disposed upstream from the modulator and configured to split an effluent and deliver a portion of the effluent to waste and a portion of the effluent to the modulator, or (ii) a second splitter disposed downstream from the modulator and configured to split the effluent to deliver a portion of the effluent to waste and a portion of the effluent to the secondary column.

Implementations of the disclosure may include one or more of the following features. In some implementations, the modulator is one of a representative modulator, a representative thermal modulator, a full transfer flow modulator, a full transfer thermal modulator, a low duty cycle modulator, or a microfluidic flow modulator.

The re-sampling device may include a first accumulating loop, a second accumulating loop, a first switch configured to selectively deliver the effluent from the first splitter to one of the first accumulating loop or the second accumulating loop, and a second switch configured to selectively deliver the effluent from one of the first accumulating loop or the second accumulating loop to the second splitter. The re-sampling device may include an auxiliary gas supply configured to flush one of the first accumulating loop or the second accumulating loop.

When the first switch and the second switch are in a first position, the auxiliary gas supply may flush the first accumulating loop, and when the first switch and the second switch are in a second position, the auxiliary gas supply may flush the second accumulating loop. A portion of the effluent from the primary column may be accumulated in the first accumulating loop while the auxiliary gas supply flushes the second accumulating loop. A portion of the effluent from the primary column may be accumulated in the second accumulating loop while the auxiliary gas supply flushes the first accumulating loop. The first accumulating loop may include a first volume and the second accumulating loop may include a second volume equal to the first volume. At least one of the first splitter or the second splitter may be integrally formed with the modulator.

Another aspect of the disclosure provides a re-sampling device for two-dimensional gas chromatography, the re-sampling device comprising a modulator and at least one of (i) a first splitter disposed upstream from the modulator and configured to split an effluent from a primary column and deliver a portion of the effluent to waste and a portion of the effluent to the modulator, or (ii) a second splitter disposed downstream from the modulator and configured to split the effluent to deliver a portion of the effluent to waste and a portion of the effluent to a secondary column.

Implementations of the disclosure may include one or more of the following features. In some implementations, the modulator is one of a representative modulator, a representative thermal modulator, a full transfer flow modulator, a full transfer thermal modulator, a low duty cycle modulator, or a microfluidic flow modulator.

The re-sampling device may include a first accumulating loop, a second accumulating loop, a first switch configured to selectively deliver the effluent from the first splitter to one of the first accumulating loop or the second accumulating loop, and a second switch configured to selectively deliver the effluent from one of the first accumulating loop or the second accumulating loop to the second splitter. The re-sampling device may include an auxiliary gas supply configured to flush one of the first accumulating loop or the second accumulating loop.

When the first switch and the second switch are in a first position, the auxiliary gas supply may flush the first accumulating loop, and when the first switch and the second switch are in a second position, the auxiliary gas supply may flush the second accumulating loop. A portion of the effluent from the primary column may be accumulated in the first accumulating loop while the auxiliary gas supply flushes the second accumulating loop. A portion of the effluent from the primary column may be accumulated in the second accumulating loop while the auxiliary gas supply flushes the first accumulating loop. The first accumulating loop may include a first volume and the second accumulating loop may include a second volume equal to the first volume.

The re-sampling device may be implemented in a device for two-dimensional gas chromatography including a primary column and the secondary column. The secondary column may be downstream from the primary column and the re-sampling device may be disposed between the primary column and the secondary column. At least one of the first splitter or the second splitter may be integrally formed with the modulator.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
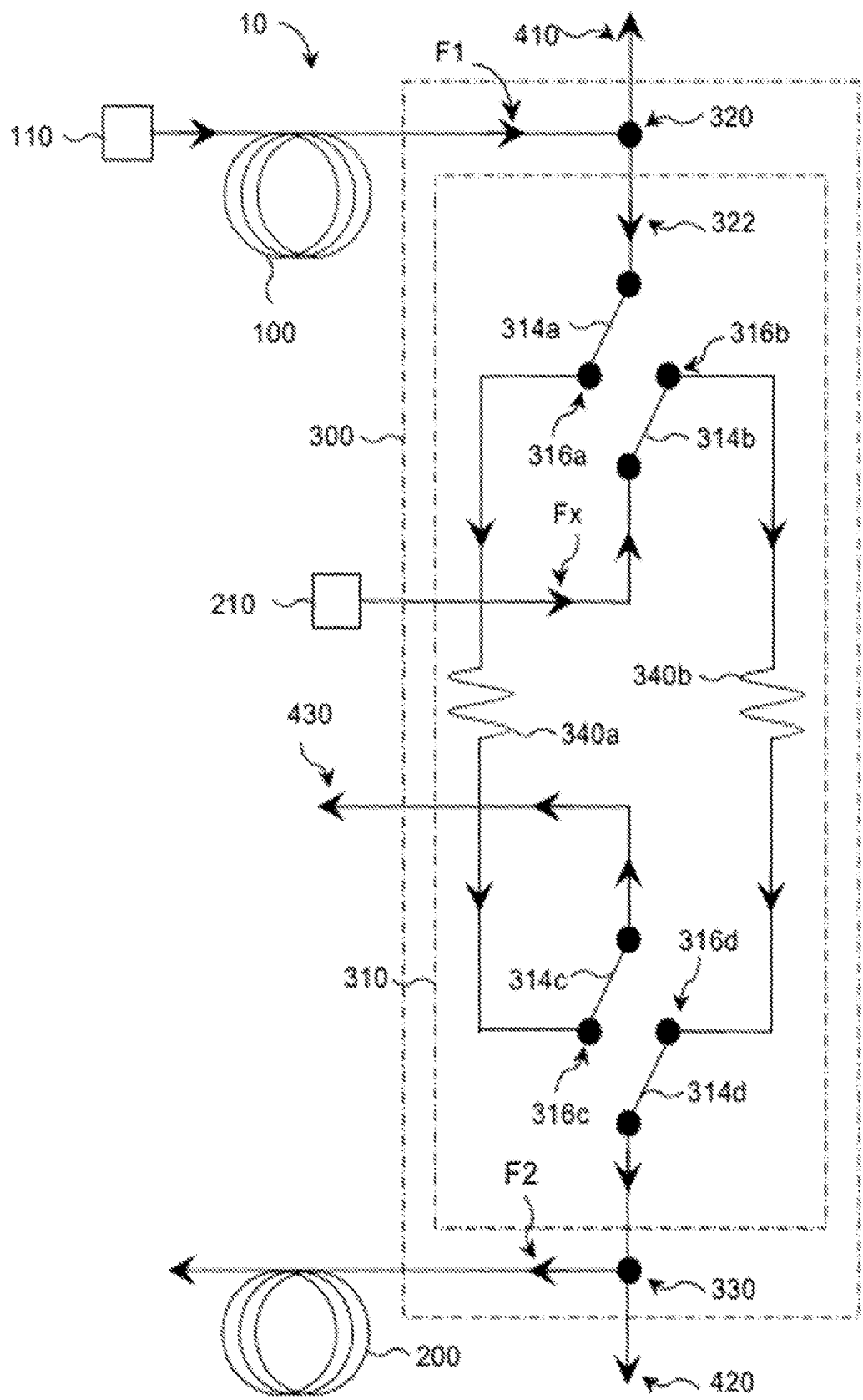
FIG. 1A is a schematic view of an exemplary comprehensive two-dimensional gas chromatography system in a first position in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 1B:
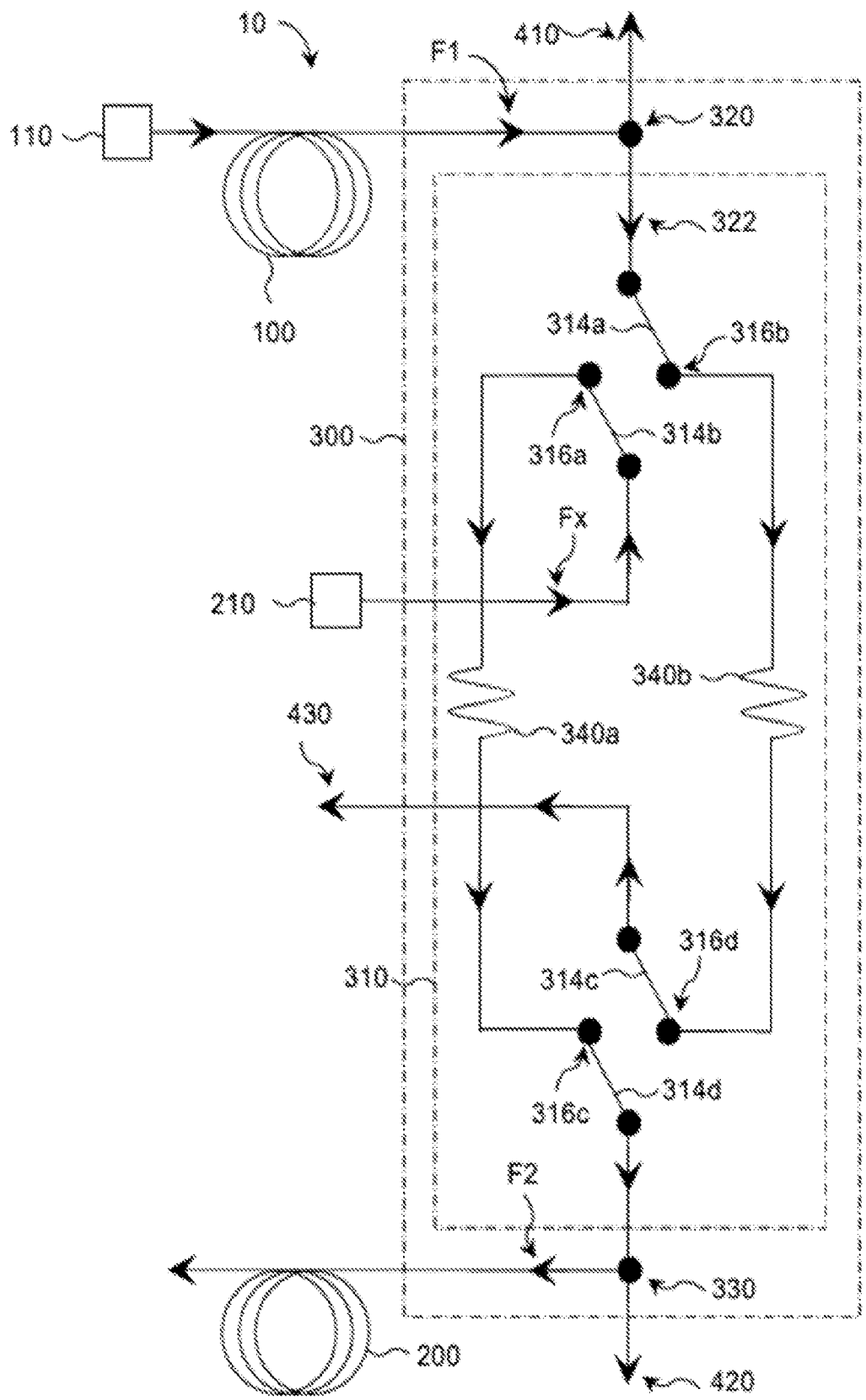
FIG. 1B is a schematic view of the comprehensive two-dimensional gas chromatography system of FIG. 1A in a second position.
Figure 4A:
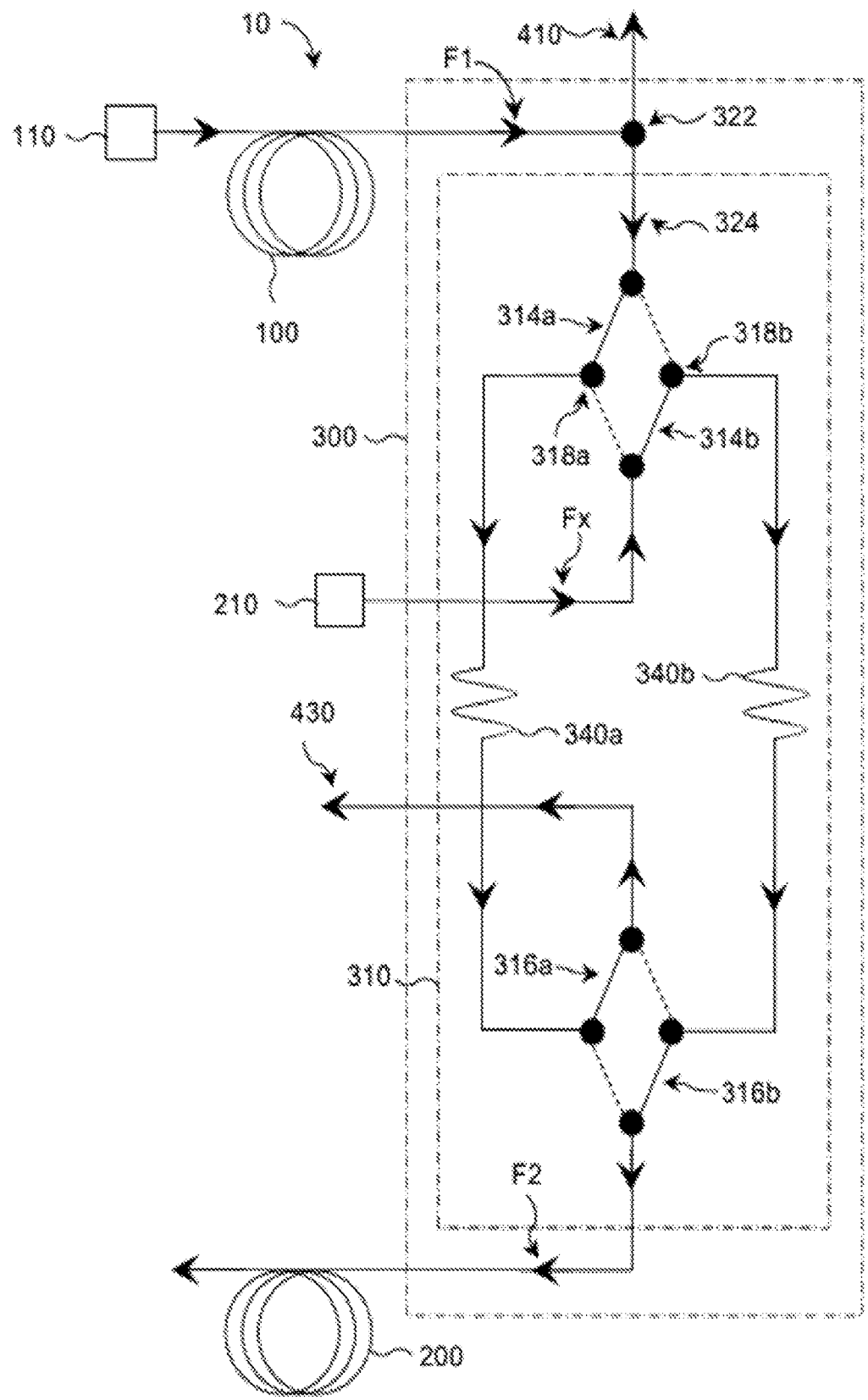
FIG. 4A is a schematic view of an exemplary comprehensive two-dimensional gas chromatography system with a pre-splitter in accordance with principles of the present disclosure.
Figure 4B:
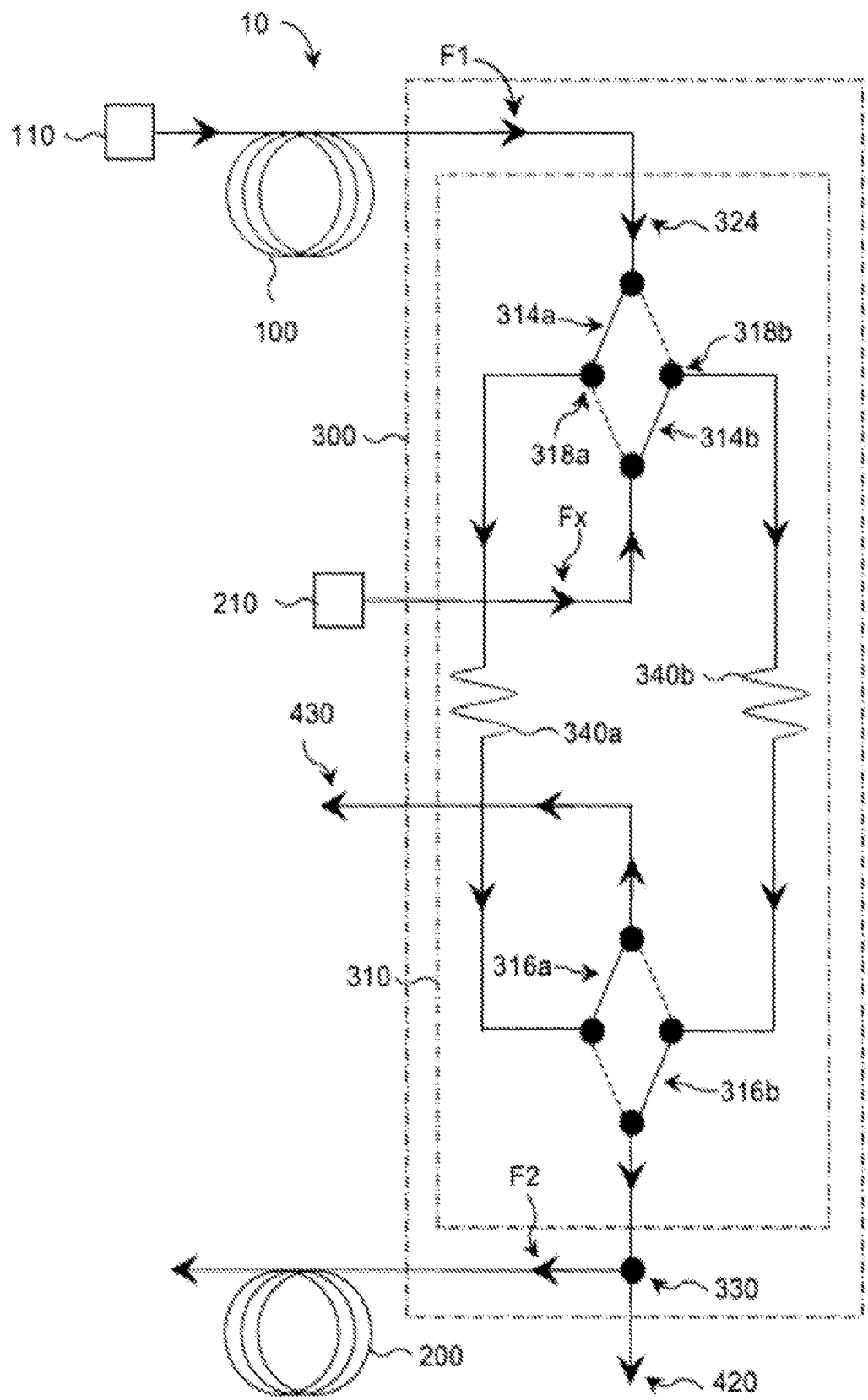
FIG. 4B is a schematic view of an exemplary comprehensive two-dimensional gas chromatography system with a post-splitter in accordance with principles of the present disclosure.

Referring to FIGS. 1A and 1B, in some implementations, a comprehensive two-dimensional gas chromatography system 10 (GC×GC system) includes a first column 100 (e.g., a primary column), a second column 200 (e.g., a secondary column), and a modulator assembly or re-sampling device 300 in fluid communication between the primary and second columns 100, 200 for selectively passing a carrier-bearing sample from the primary column 100 to the secondary column 200. In some implementations, the modulator assembly 300 includes a modulator 310. In some implementations, where the modulator 310 is a full transfer flow modulator, the flow can be either pre-split (before full-transfer modulation, as shown in FIG. 4A) or post-split (after full-transfer modulation, as shown in FIG. 4B).

By its functionality, the modulator assembly 300 may be referred to as a representative modulator. Similar to a snapshot modulator, the modulator assembly 300 may direct only a fraction of the primary effluent to the secondary column. Unlike a snapshot modulator, the modulator assembly 300 may direct to the secondary column a representative (consistent) fraction of the entire primary eluite regardless of the modulation phase. For example, the modulator assembly 300 may be designed and operated to direct 1% of each component of the primary eluite to the secondary column regardless of the modulation phase for each component. Compared to a full transfer modulator, which accumulates the entire primary eluite during the modulation period, the modulator assembly 300 may accumulate a representative (consistent) fraction of the primary eluite during the modulation period. In some implementations, the modulator 310 may include a two-state eight port rotary valve structure. In other implementations, the modulator may include one or more Deans' switches. In yet other implementations, the modulator may be implemented as a microfluidic flow modulator. In other implementations still, the modulator 310 may include any suitable structure.

The modulator assembly 300 may include a pre-splitter 320 and/or a post-splitter 330. For example, when the modulator assembly 300 is a single-split flow modulator, the modulator assembly 300 may include one of the pre-splitter 320 or the post-splitter 330. As another example, when the modulator assembly 300 is a dual-split flow modulator, the modulator assembly 300 may include both the pre-splitter 320 and the post-splitter 330. In some implementations, when the modulator assembly 300 includes only the pre-splitter 320, a split ratio may have to be relatively high to achieve as narrow of reinjections as when the modulator assembly 300 includes both the pre-splitter 320 and the post-splitter 330, and an accumulator flow and accumulator volume may be relatively low. In other implementations, when the modulator assembly 300 includes only the post-splitter 330, the accumulator flow and accumulator volume may have to be relatively large to achieve as narrow of reinjections as when the modulator assembly 300 includes both the pre-splitter 320 and the post-splitter 330. Further modifications may be required for single-split flow modulation including either a pre-splitter or a post-splitter.

Referring to FIGS. 1A and 1B, the modulator 310 includes a first switch 314a, a second switch 314b, a third switch 314c, and a fourth switch 314d. The first switch 314a and the second switch 314b are movable between a first node 316a and a second node 316b. When the first switch 314a is at the first node 316a, the second switch 314b is at the second node 316b and vice versa. The third switch 314c and the fourth switch 314d are movable between a third node 316c and a fourth node 316d. When the third switch 314c is at the third node 316c, the fourth switch 314d is at the fourth node 316d and vice versa. As can be seen in FIG. 1A, the modulator 310 is operating at a first cycle where the first switch 314a is at the first node 316a, the second switch 314b is at the second node 316b, the third switch 314c is at the third node 316c, and the fourth switch 314d is at the fourth node 316d. As can be seen in FIG. 1B, the modulator 310 is operating at a second cycle where the first switch 314a is at the second node 316b, the second switch 314b is at the first node 316a, the third switch 314c is at the fourth node 316d, and the fourth switch 314d is at the third node 316c. The modulator 310 may be any suitable device, including, but not limited to, a representative modulator, a representative thermal modulator, a full transfer flow modulator, a full transfer thermal modulator, a microfluidic flow modulator, etc. As described herein, a full transfer flow modulator ideally transfers 100% of the sample. However, a practically-designed full transfer flow modulator may transfer less than 100% of the sample. In principle, the modulator 310 may be any modulator including a low duty cycle modulator that transfers a small fraction of the sample.

The pre-splitter 320 splits the effluent of column 100 into two streams: a pre-modulator stream 322 and a first waste stream 410. The pre-modulator stream 322 is sent to the first switch 314a and the first waste stream 410 is sent to waste. Similarly, the post-splitter 330 splits the effluent of the fourth switch 314d into two streams: a post-modulator stream $F_2$ and a second waste stream 420. The post-modulator stream $F_2$ is sent to the secondary column 200 (i.e., the post-modulator stream $F_2$ is the flow of the secondary column 200) and the second waste stream 420 is sent to waste. As set forth above, the modulator assembly 300 may include either the pre-splitter 320 (FIG. 4A) or the post-splitter 330 (FIG. 4B) or both the pre-splitter 320 and the post-splitter 330 (FIGS. 1A and 1B). In some implementations, one or both of the pre-splitter 320 or the post-splitter 330 are integrally formed with the modulator 310.

The modulator 310 includes a first accumulating loop 340a and a second accumulating loop 340b. The first accumulating loop 340a and the second accumulating loop 340b alternate between two cycles of equal duration known as a modulation period or sampling period $\Delta t_s$. In each cycle, one of the first accumulating loop 340a or the second accumulating loop 340b accumulates a fraction of the effluent from the primary column 100 while the other of the first accumulating loop 340a or the second accumulating loop 340b is being flushed by the flow from an auxiliary gas supply 210. The first accumulating loop 340a and the second accumulating loop 340b each include an inlet and an outlet that are controlled by the switches 314a, 314b, 314c and 314d.

Figure 2A:
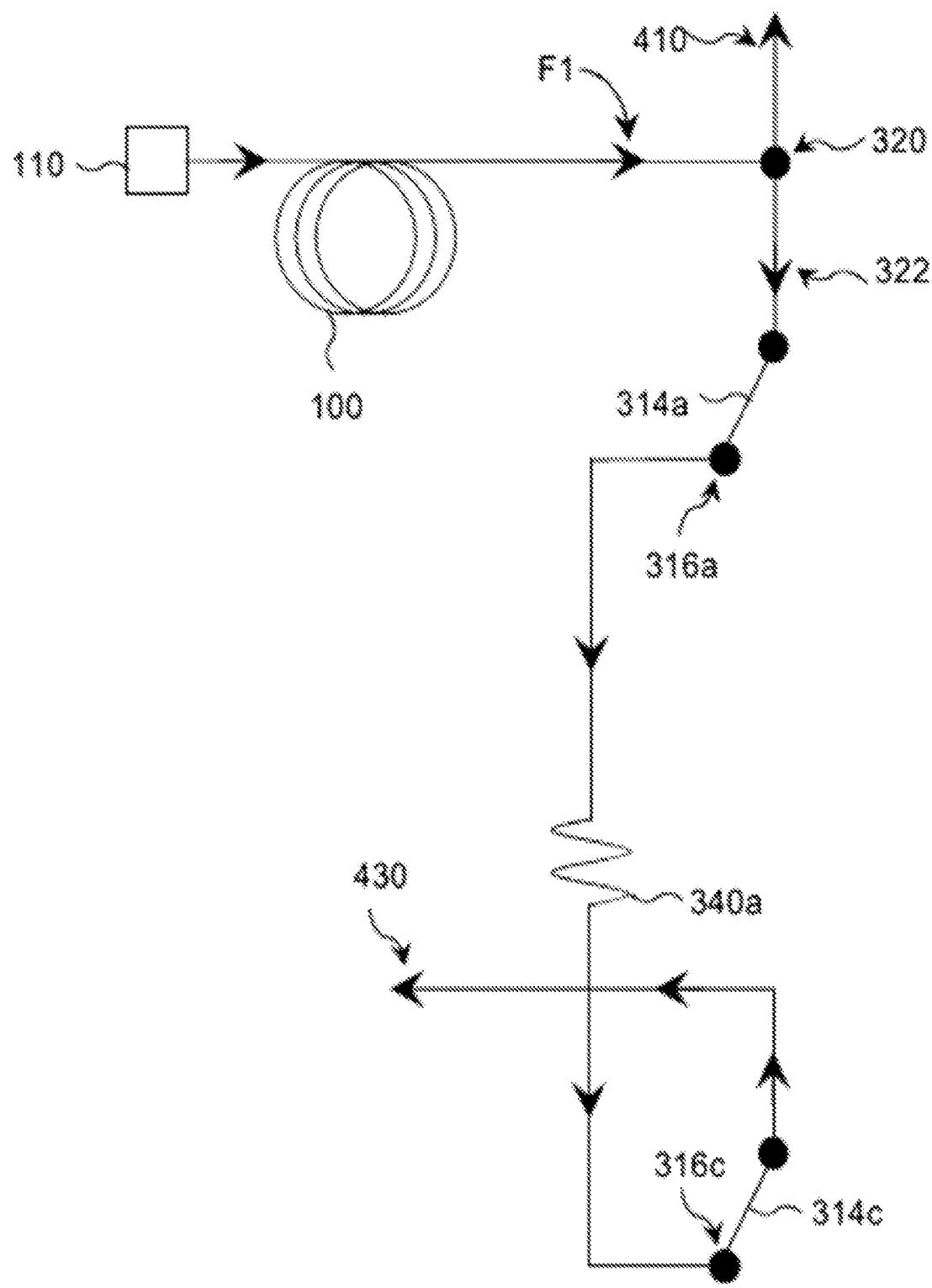
FIG. 2A is a schematic view of a primary flow path of the comprehensive two-dimensional gas chromatography system of FIG. 1A in the first position.
Figure 2B:
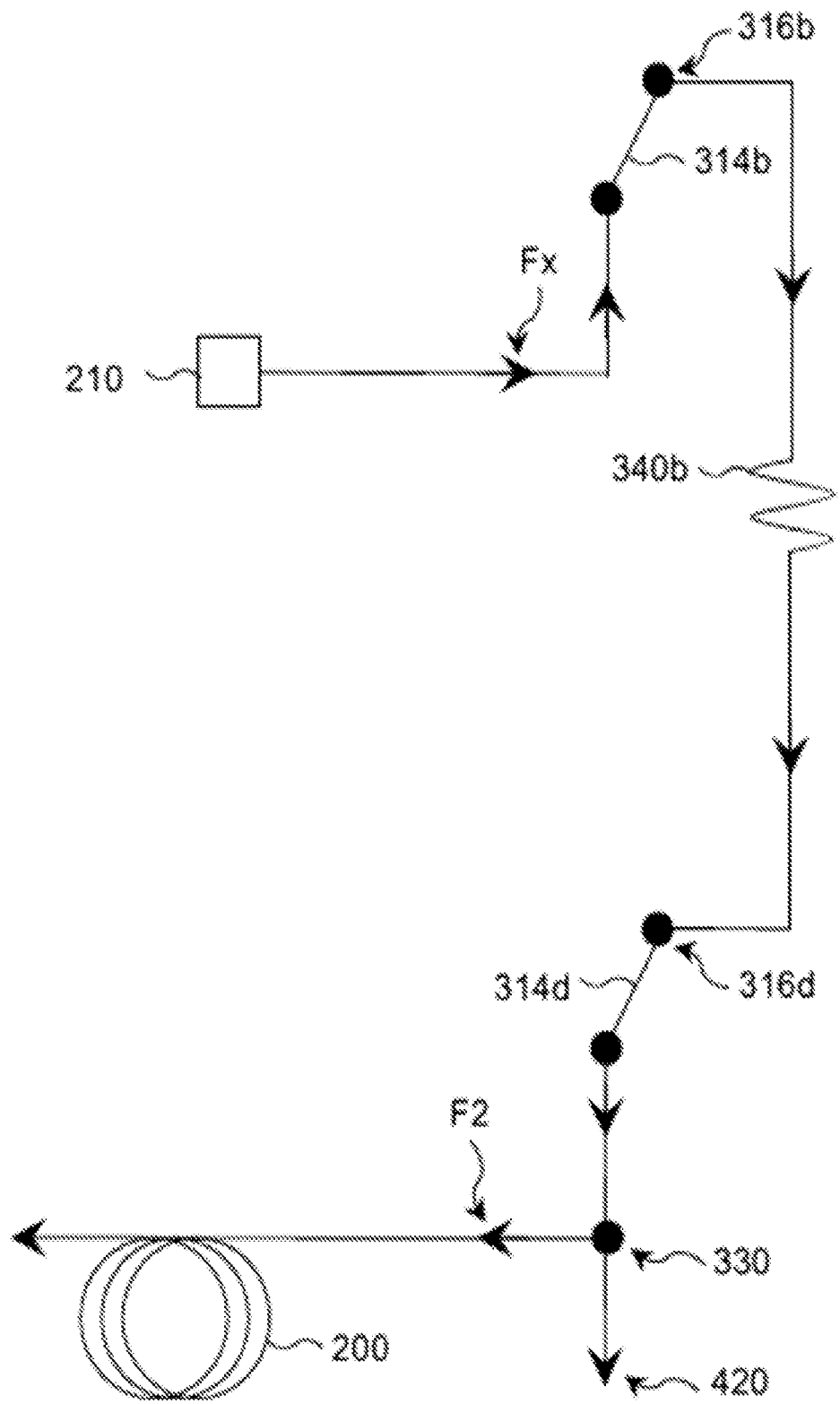
FIG. 2B is a schematic view of a secondary flow path of the comprehensive two-dimensional gas chromatography system of FIG. 1A in the first position.
Figure 3A:
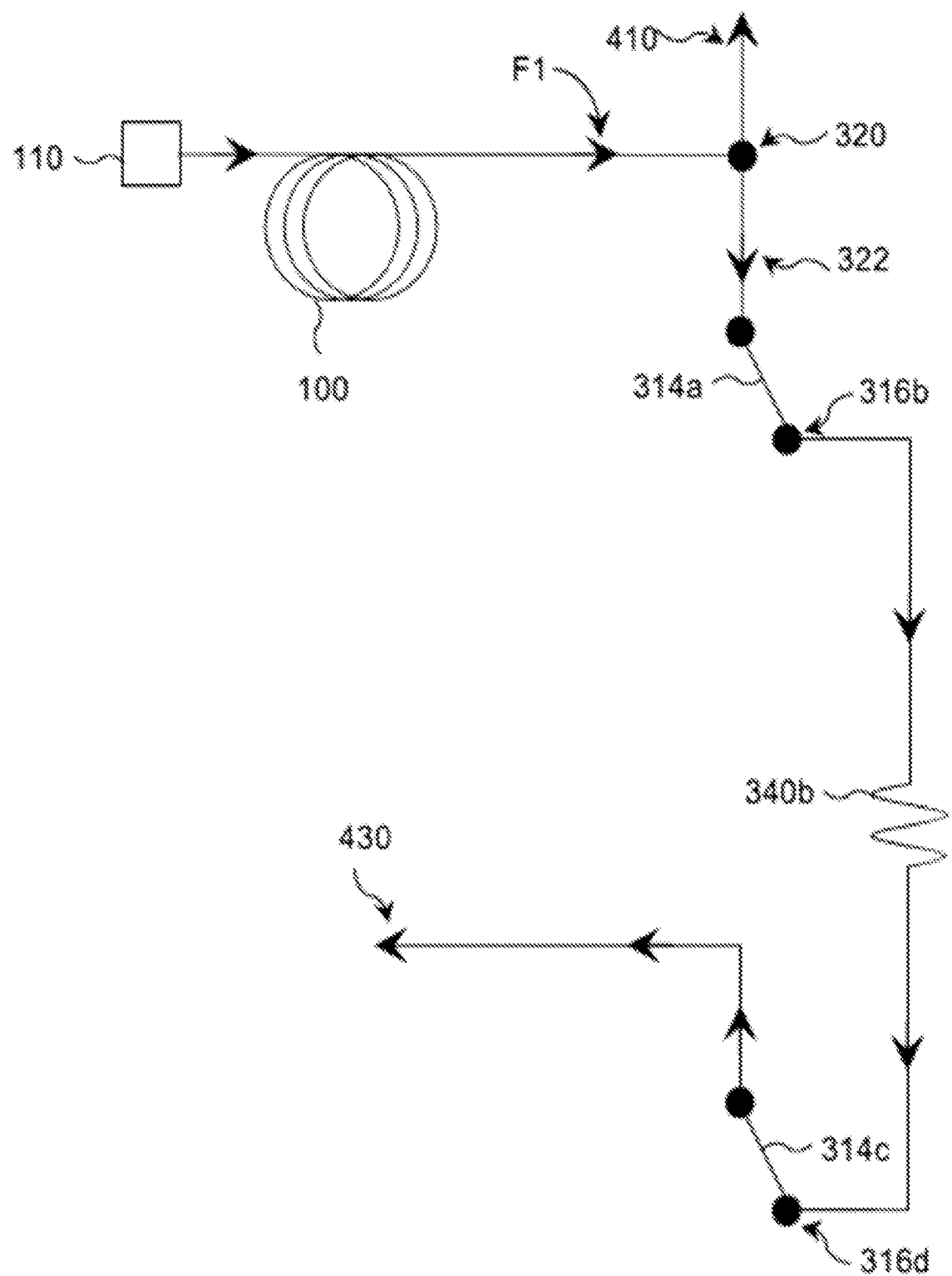
FIG. 3A is a schematic view of a primary flow path of the comprehensive two-dimensional gas chromatography system of FIG. 1B in the second position.
Figure 3B:
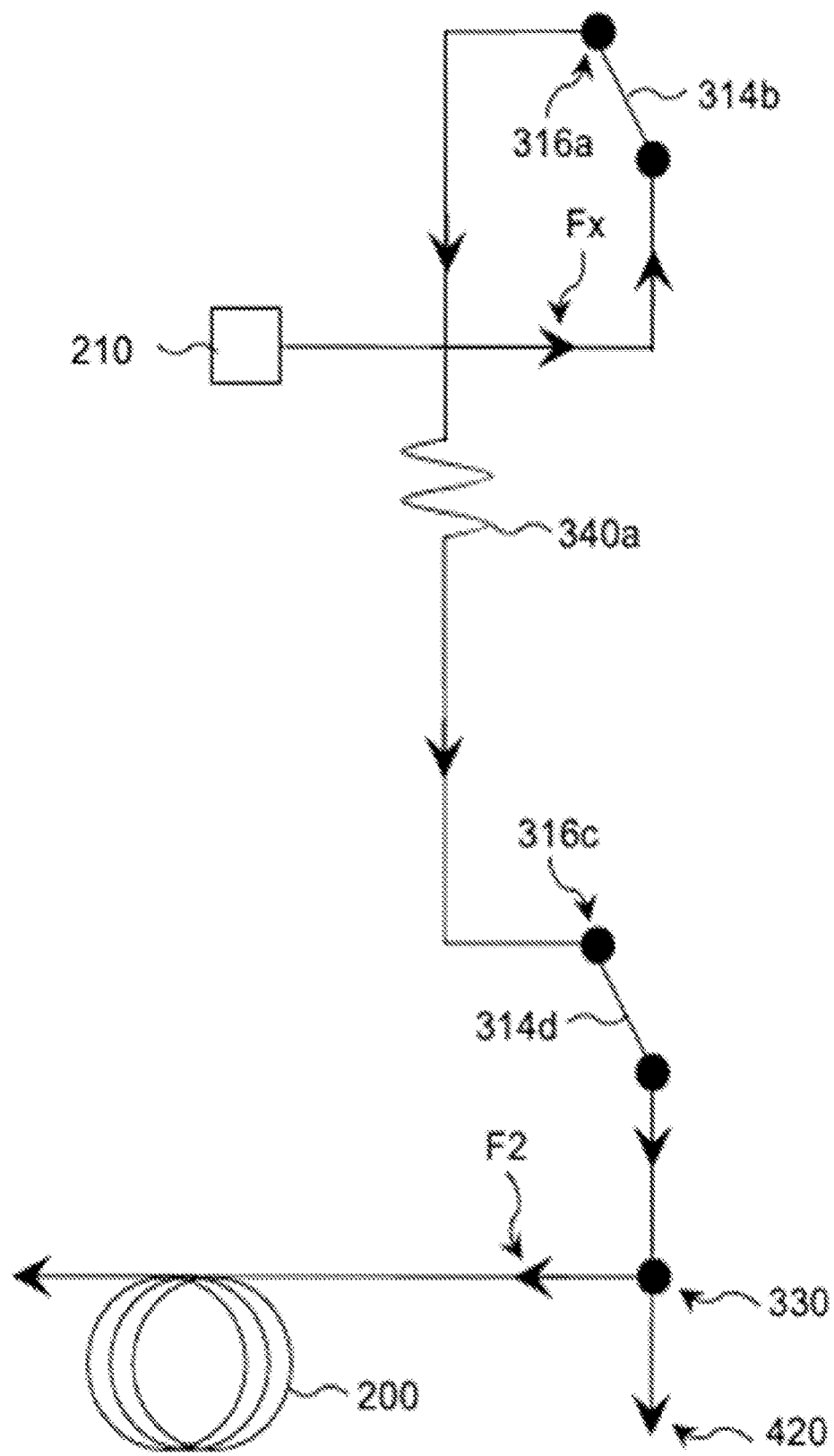
FIG. 3B is a schematic view of a secondary flow path of the comprehensive two-dimensional gas chromatography system of FIG. 1B in the second position.

Referring to FIGS. 2A-3B, the modulator 310 operating at the first cycle includes a first primary flow path (FIG. 2A) and a first secondary flow path (FIG. 2B), and the modulator 310 operating at the second cycle includes a second primary flow path (FIG. 3A) and a second secondary flow path (FIG. 3B). The flow paths are isolated in FIGS. 2A-3B for improved clarity, however, it should be understood that the first primary flow path exists simultaneously with the first secondary flow path and the second primary flow path exists simultaneously with the second secondary flow path.

Referring to FIG. 2A, in the first primary flow path, a fraction of the effluent from the primary column 100 is being accumulated in the first accumulating loop 340a. The fractioning takes place at the pre-splitter 320. During the accumulation, the carrier gas accumulated in the first accumulating loop 340a during the previous cycle is being flushed to waste 430. Referring to FIG. 2B, in the first secondary flow path, a fraction of the content of the second accumulating loop 340b accumulated during the previous cycle is being flushed through the secondary column 200. The fractioning takes place at the post-splitter 330.

Referring to FIG. 3A, in the second primary flow path, a fraction of the effluent from the primary column 100 is being accumulated in the second accumulating loop 340b. The fractioning takes place at the pre-splitter 320. During the accumulation, the carrier gas accumulated in the second accumulating loop 340b during the previous cycle is being flushed to waste 430. Referring to FIG. 3B, in the second secondary flow path, a fraction of the content of the first accumulating loop 340a accumulated during the previous cycle is being flushed through the secondary column 200. The fractioning takes place at the post-splitter 330.

In some implementations, the first accumulating loop 340a and the second accumulating loop 340b each have the same volume V. For example, the volume V may be large enough to avoid overflow of the accumulating loops 340a, 340b during the sampling period $\Delta t_s$. The primary column 100 has a primary flow rate $F_1$ and the pre-splitter 320 has a pre-split ratio $S_1$. In order to prevent the accumulating loops 340a, 340b from overflowing, the volume V should be larger than a volume minimum $V_{min}=S_1 \cdot F_1 \cdot \Delta t_s$. For example, if $S_1=1/20$, $F_1=1.5$ mL/min, and $\Delta t_s=1$s, then $V_{min}=1.25$ μL.

The modulator assembly 300 may reinject into the secondary column 200 a representative fraction of the effluent from the primary column 100 as a sharp reinjection pulse. The reinjection occurs at the beginning of the modulation period $\Delta t_s$ following after the previous accumulation period of that duration. The reinjection pulse has a width $\Delta t_i$, which, in some implementations, may be narrower than the modulation period $\Delta t_s$. That is, $\Delta t_i < \Delta t_s$.

The auxiliary gas supply 210 provides a flow rate $F_x$ that may be designed to be high enough to flush the accumulating loops 340a, 340b in a time substantially equal to the reinjection pulse width $\Delta t_i$. In some implementations, the flow rate $F_x$ of the auxiliary gas supply 210 is larger than a flow rate minimum $F_{x,min}$ defined as: $F_{x,min}=V/\Delta t_i$. For example, if V=1.25 μL and $\Delta t_i=10$ ms, then $F_{x,min}=7.5$ mL/min.

During snapshot modulation, the width of the reinjection pulse is controlled by the timing of ON and OFF switching, which may cause problems in the generation of narrow pulses. Conversely, in the modulator assembly 300, the reinjection pulse width $\Delta t_i$ as a fraction of the modulation period $\Delta t_s$ is controlled by a flow ratio $R=(S_1 \cdot F_1)/F_x$, which may be a more predictable arrangement than the timing of ON and OFF switching in snapshot modulation. However, in some implementations in which one or both of the pre-splitter 320 or the post-splitter 330 are integrally formed with the flow modulator 310, the reinjection pulse width may depend on the timing of the ON and OFF switching, similar to snapshot modulation.

During each modulation period $\Delta t_s$, the inlet flow $F_2$ of the secondary column 200 contains the analyte only during the reinjection pulse width $\Delta t_i$. Throughout the rest of the modulation period $\Delta t_s$, the inlet flow $F_2$ of the secondary column 200 consists only of the gas from the auxiliary gas supply 210.

The pre-splitter 320 may reduce the demand for a high flow rate $F_x$ of the auxiliary gas supply 210. Thus, if the modulator 310 did not include the pre-splitter 320, then the pre-split ratio $S_1$ would equal 1. Following the previous examples, if V=1·1.5 mL/min·1 s=25 μL and Δ$t_i$=10 ms, then $F_{x,min}$=150 mL/min.

In some implementations, a fraction of the effluent of one of the accumulating loops 340a, 340b flows through the secondary column 200. The fractioning takes place in the post-splitter 330. The post-splitter 330 may accommodate independent requirements to the flow rate $F_x$ of the auxiliary gas supply 210 and to a secondary flow rate $F_2$ through the secondary column 200. The post-splitter 330 includes a post-split ratio $S_2=F_2/F_x$. For example, if $F_2$=2.4 mL/min and $F_x$ =7.5 mL/min, then $S_2$=0.32.

As set forth above, the modulator 310 including the first accumulating loop 340a and the second accumulating loop 340b may allow for each reinjection into the secondary column 200 to represent the effluent from the primary column 100 accumulated during the modulation period Δ$t_s$. For example, this means that the relative fractions of all analytes reinjected into the secondary column 200 may be exactly the same as they are in the accumulated effluent from the primary column 100.

Referring to FIGS. 1A, 2A, and 2B, the GC×GC system 10 may operate at the first cycle. A sample may be injected into the inlet 110 and into the primary column 100. In some implementations, the primary effluent proceeds to the pre-splitter 320 and then to the first switch 314a, the effluent being split at the pre-splitter 320 with a fraction of the effluent going to waste 410 and a fraction of the effluent proceeding to the first switch 314a. In other implementations, the effluent proceeds directly to the first switch 314a. With the first switch 314a positioned at the first node 316a, the effluent exiting the first node 316a flows to the first accumulating loop 340a where the effluent is accumulated while the previous content of the first accumulating loop 340a is flushed to waste 430 through the third switch 314c at the third node 316c. Simultaneous to the foregoing, the auxiliary gas supply 210 directs gas through the second switch 314b at the second node 316b, through the second accumulating loop 340b, through the fourth switch 314d at the fourth node 316d, to the post-splitter 330 and to the secondary column 200, the effluent being split at the post-splitter 330 with a fraction of the effluent going to waste 420 and a fraction of the effluent proceeding to the secondary column 200. In other implementations, the effluent proceeds directly from the fourth switch 314d to the secondary column 200.

Referring to FIGS. 1B, 3A, and 3B, the GC×GC system 10 may operate at the second cycle. A sample may be injected into the inlet 110 and into the primary column 100. In some implementations, the primary effluent proceeds to the pre-splitter 320 and then to the first switch 314a, the effluent being split at the pre-splitter 320 with a fraction of the effluent going to waste 410 and a fraction of the effluent proceeding to the first switch 314a. In other implementations, the effluent proceeds directly to the first switch 314a. With the first switch 314a positioned at the second node 316b, the effluent exiting the second node 316b flows to the second accumulating loop 340b where the effluent is accumulated while the previous content of the second accumulating loop 340b is flushed to waste 430 through the third switch 314c at the fourth node 316d. Simultaneous to the foregoing, the auxiliary gas supply 210 directs gas through the second switch 314b at the first node 316a, through the first accumulating loop 340a, through the fourth switch 314d at the third node 316c, to the post-splitter 330 and to the secondary column 200, the effluent being split at the post-splitter 330 with a fraction of the effluent going to waste 420 and a fraction of the effluent proceeding to the secondary column 200. In other implementations, the effluent proceeds directly from the fourth switch 314d to the secondary column 200.

The GC×GC system 10 as described herein may allow for flexibility in independent choosing of the sampling period Δ$t_s$, the volume V of the accumulation loops 340a, 340b, as well as the flow rates $F_1$, $F_2$, $F_x$ in the primary column 100, the secondary column 200, and from the auxiliary gas supply 210, respectively. Particularly, the GC×GC system 10 may: avoid a demand for too large or too low volumes V of the accumulation loops 340a, 340b; avoid a demand for high auxiliary flow rate $F_x$ that might be otherwise necessary for obtaining sharp reinjection pulses; avoid a demand for excessively high (well above chromatographic optimum) flow rates $F_2$ in the secondary column 200; avoid a demand for too low flow rates $F_1$ in the primary column 100 to avoid sub-optimal operation of the primary column 100, reducing its separation performance and prolonging the analysis time.

Figure 5A:
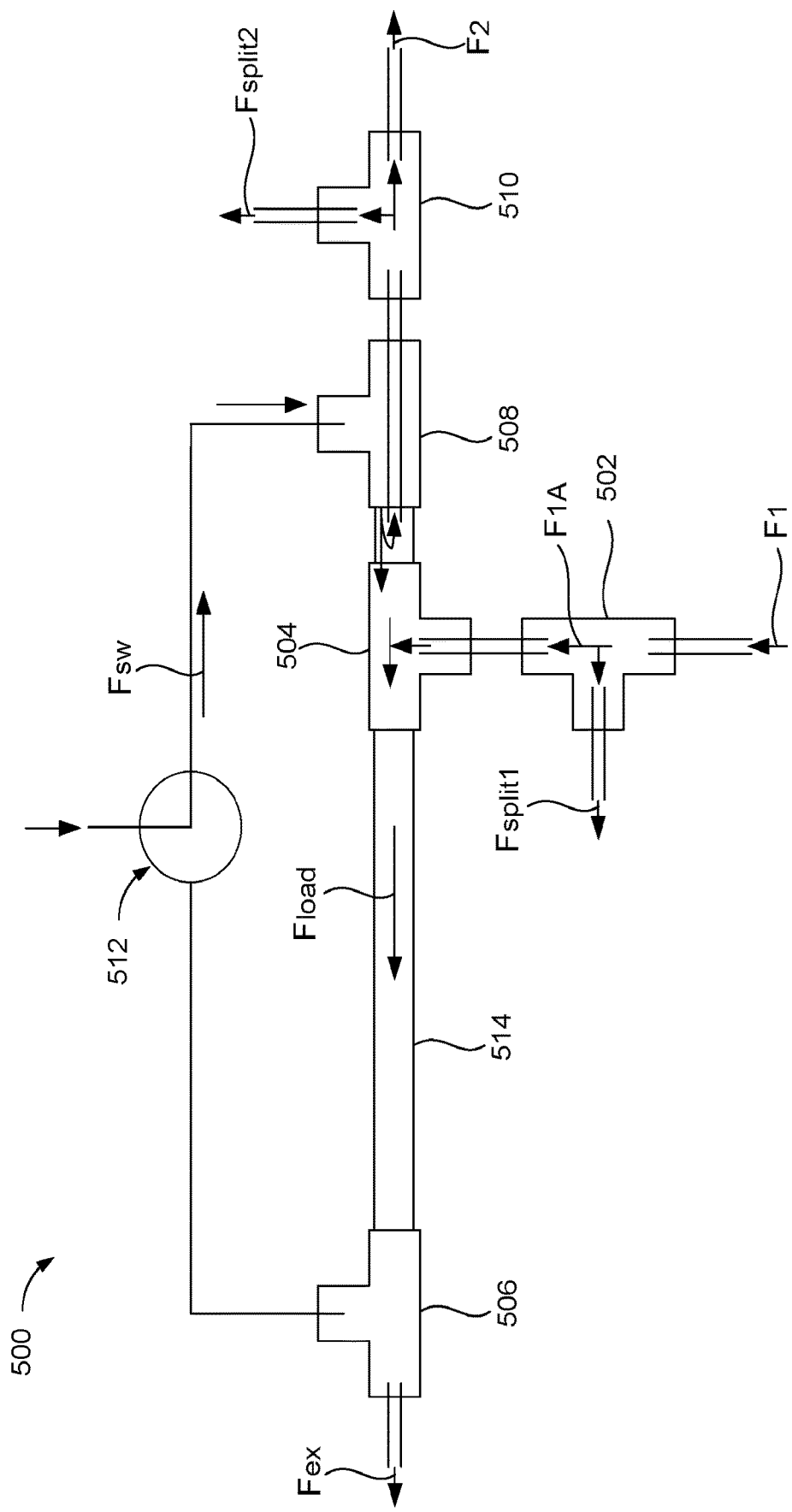
FIG. 5A is a schematic view of an exemplary modulator of a comprehensive two-dimensional gas chromatography system in a first position in accordance with principles of the present disclosure.
Figure 5B:
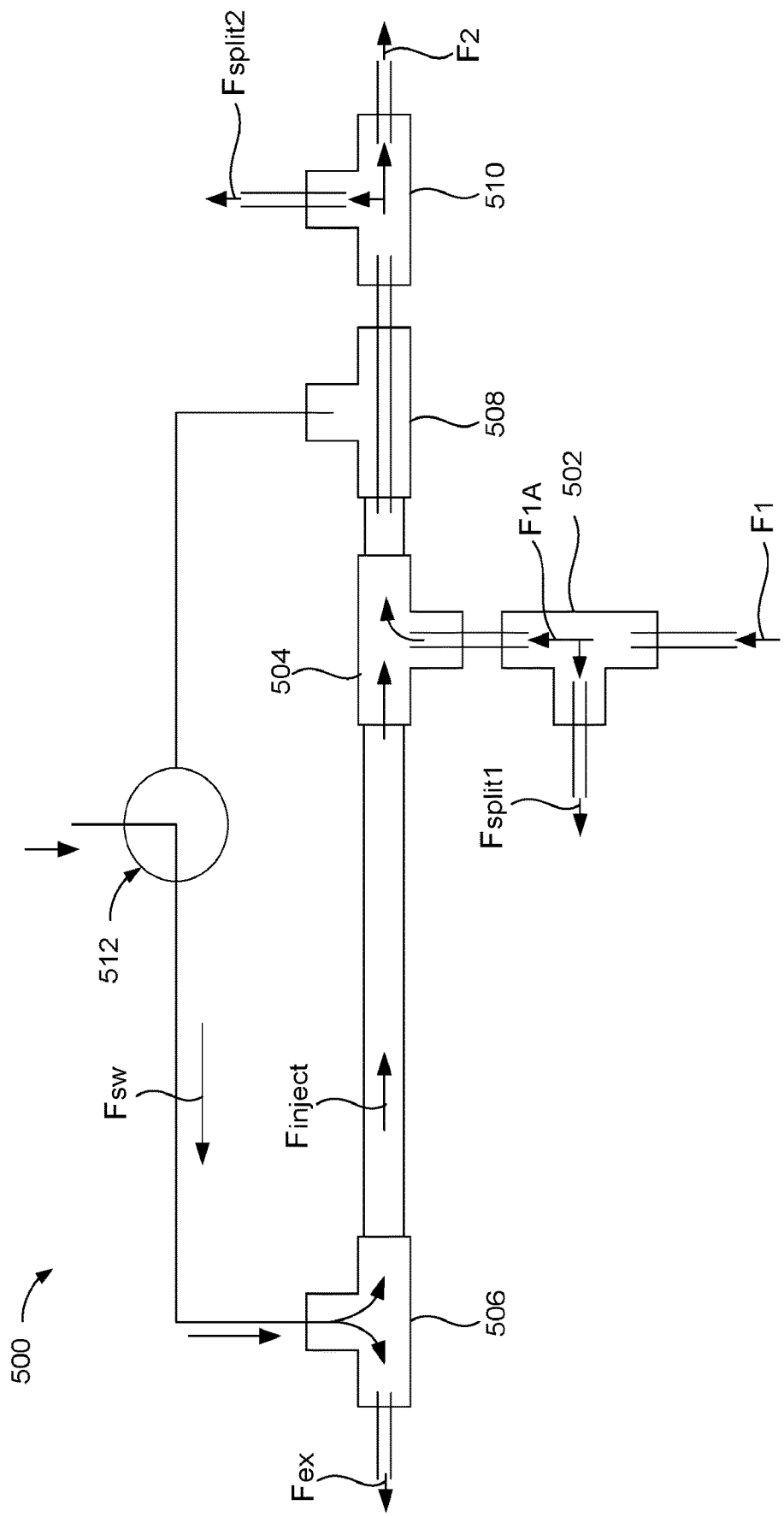
FIG. 5B is a schematic view of the modulator of FIG. 5A in a second position.

Referring to FIGS. 5A and 5B, a second exemplary modulator assembly 500 is generally shown. The modulator assembly 500 may be implemented in the GC×GC system 10 and may replace the modulator assembly 300 as described above. Alternatively, specific features of each of the modulator assemblies 300, 500 may be combined or substituted as suitable. The modulator assembly 500 may be referred to as a reverse fill/flush (RFF) differential flow modulator including a pre-split and post-split configuration. As shown in FIGS. 5A and 5B, the modulator assembly 500 may include both a pre-split and a post-split configuration; however, it should be understood that the modulator assembly 500 may be configured to include only a pre-split configuration, only a post-split configuration, or both a pre-split and a post-split configuration. The pre-split may control the amount of sample loaded in the sample loop and the post-split may control the time (speed) of the reinjection. Based on each of these processes and the split flows, the dimensions of the modulator assembly 500 can be optimized for a particular range of operating conditions (split flows, column flows, modulation period, reinjection time).

The modulator assembly 500 includes a plurality of tees or fittings, including a first fitting 502, a second fitting 504, a third fitting 506, a fourth fitting 508, and a fifth fitting 510. The modulator assembly 500 includes a switch 512 configured to control a switching flow $F_{sw}$ from a pneumatic control module (PCM) in flow control mode.

Referring to FIG. 5A, the PCM is configured to direct the switching flow $F_{sw}$ toward the fourth fitting 508. The first fitting 502 is configured to receive the primary flow $F_1$ from the primary column 100 and split the primary flow $F_1$ with a portion of the primary flow $F_1$ going to a first split flow $F_{split1}$ and a portion of the primary flow $F_{1A}$ going to the second fitting 504, i.e., the portion of the primary flow $F_{1A}$ going to the second fitting 504 is equal to the primary flow $F_1$ less the first split flow $F_{split1}$: $F_{1A}=F_1-F_{split1}$. The first split flow $F_{split1}$ may be controlled by back pressure regulation or a fixed restrictor with back pressure regulation. Depending on the primary flow $F_1$ and the modulation period, the portion of the primary flow $F_1$ sent to the second fitting 504 may be controlled to provide a nearly filled sample or accumulating loop 514, which is the connecting tube between the second fitting 504 and the third fitting 506. The portion of primary flow $F_{1A}$ and a curtain flow $F_C$ mix at the second fitting 504 to form a load flow $F_{load}$ that is sent towards the third fitting 506, filling the sample loop 514. The curtain flow $F_C$ is equal to the switching flow $F_{sw}$ from the PCM minus the sum of the secondary flow $F_2$ and the second split flow $F_{split2}$, i.e., $F_C=F_{sw}-(F_2+F_{split2})$. The third fitting 506 emits an exhaust flow $F_{ex}$ that is equal to the load flow $F_{load}$, $F_{ex}=F_{1A}+F_C$. The exhaust flow $F_{ex}$ may have no significant restriction through a chemical trap to the PCM for back pressure regulation. The fourth fitting 508 receives the switching flow $F_{sw}$ from the switch 512 and directs a portion of the switching flow $F_{sw}$ to the second fitting 504 and a portion of the switching flow $F_{sw}$ to the fifth fitting 510. The fifth fitting 510 is configured to receive the portion of the switching flow $(F_{sw}-F_C)$ and split the portion of the switching flow $(F_{sw}-F_C)$ to a second split flow $F_{split2}$ and to the secondary flow $F_2$.

Referring to FIG. 5B, the PCM is configured to direct the switching flow $F_{sw}$ toward the third fitting 506. The first fitting 502 is configured to receive the primary flow $F_1$ from the primary column 100 and split the primary flow $F_1$ with a portion of the primary flow $F_1$ going to the first split flow $F_{split1}$ and a portion of the primary flow $F_1A$ going to the second fitting 504, i.e., the portion of the primary flow $F_{1A}$ going to the second fitting 504 is equal to the primary flow $F_1$ less the first split flow $F_{split1}$: $F_{1A}=F_1-F_{split1}$. The portion of the primary flow $F_{1A}$ and an inject flow $F_{inject}$ mix at the second fitting 504, pass through the fourth fitting 508, and split at the fifth fitting 510 to the second split flow $F_{split2}$ and the secondary flow $F_2$. The second split flow $F_{split2}$ may be controlled by back pressure regulation or a fixed restrictor with back pressure regulation. The inject flow $F_{inject}$ is equal to the switching flow $F_{sw}$ minus the portion of the primary flow $F_{1A}$ minus the curtain flow $F_C$, i.e., $F_{inject}=F_{sw}-F_{1A}-F_C$. The third fitting 506 emits an exhaust flow $F_{ex}$ that is equal to the portion of the primary flow $F_{1A}$ plus the curtain flow $F_C$, i.e., $F_{ex}=F_{1A}+F_C$. The third fitting 506 receives the switching flow $F_{sw}$ from the switch 512 and directs a portion of the switching flow $F_{sw}$ to the second fitting 504 to form the inject flow $F_{inject}$.

Figure 6A:
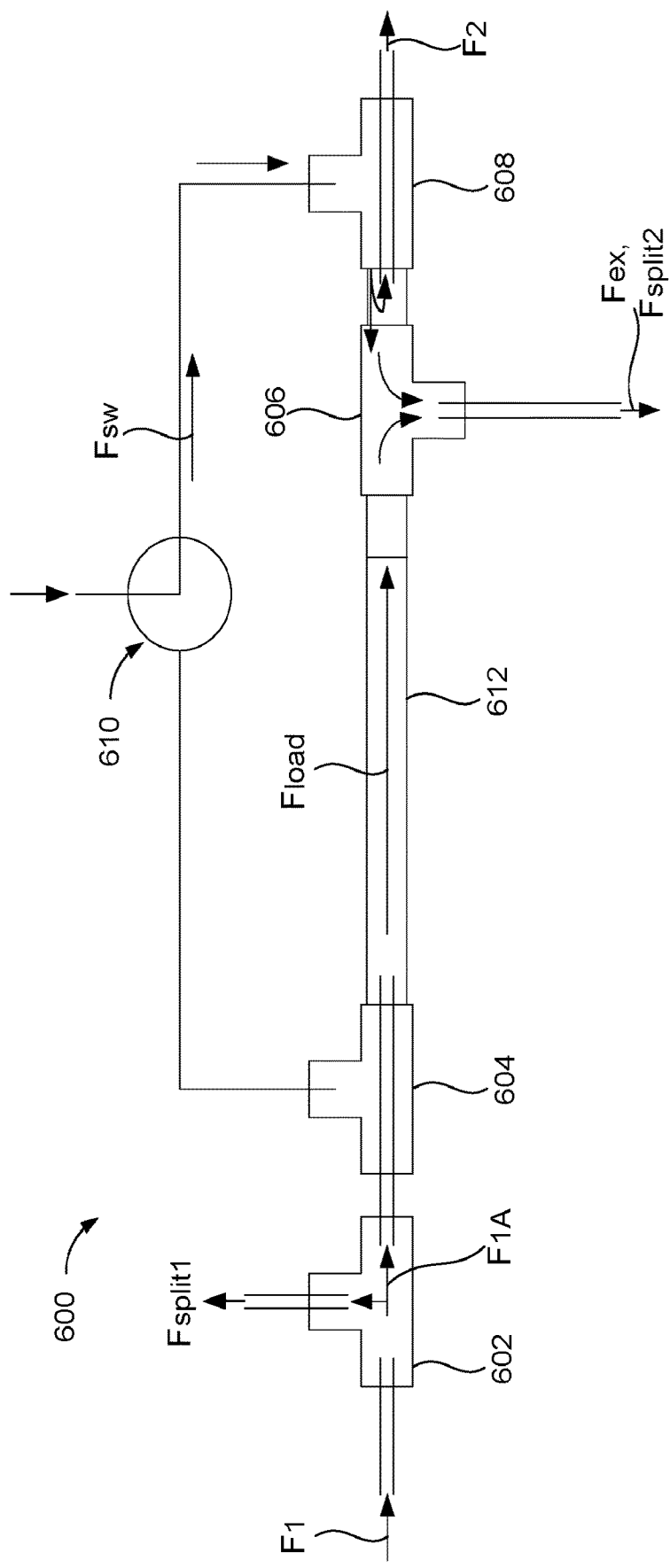
FIG. 6A is a schematic view of an exemplary modulator of a comprehensive two-dimensional gas chromatography system in a first position in accordance with principles of the present disclosure.
Figure 6B:
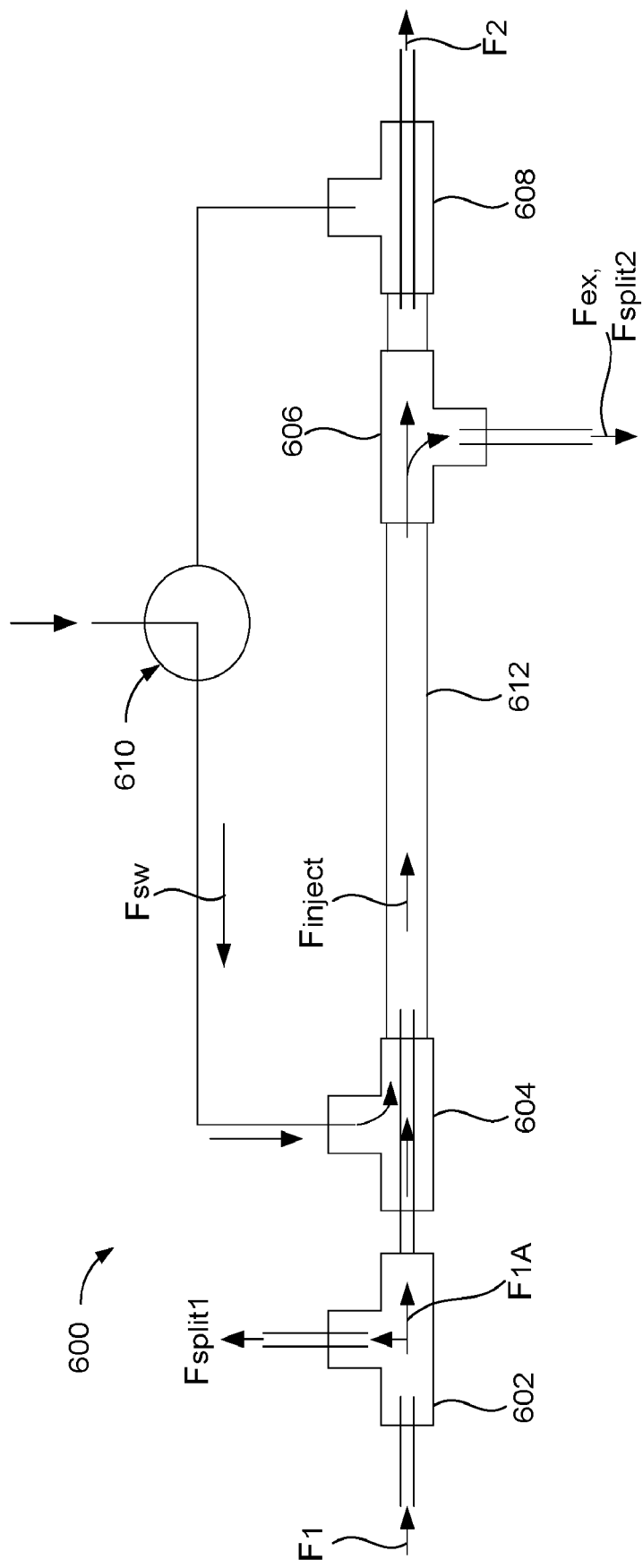
FIG. 6B is a schematic view of the modulator of FIG. 6A in a second position.

Referring to FIGS. 6A and 6B, a second exemplary modulator assembly 600 is generally shown. The modulator assembly 600 may be implemented in the GCxGC system 10 and may replace the modulator assemblies 300, 500 as described above. Alternatively, specific features of each of the modulator assemblies 300, 500, 600 may be combined or substituted as suitable. The modulator assembly 600 may be referred to as a microfluidic representative flow modulator with a pre-split and an inherent post-split. As shown in FIGS. 6A and 6B, the modulator assembly 600 may include both a pre-split and a post-split configuration; however, it should be understood that the modulator assembly 600 may be configured to include only a post-split configuration or both a pre-split and a post-split configuration. The pre-split may control the amount of sample loaded in the sample loop. This allows the sample loop to be designed and optimized for a particular range of operating conditions (primary column flow and modulation period) and by reducing the sample size, less carrier gas is required for a reduced post-split flow. The inherent post-split may control the reinjection time. With the pre-split reducing the sample volume, the post-split flow can be reduced and still provide narrow reinjections.

The modulator assembly 600 includes a plurality of tees or fittings, including a first fitting 602, a second fitting 604, a third fitting 606, and a fourth fitting 608. The modulator assembly 600 includes a switch 610 configured to control a switching flow $F_{sw}$ from a pneumatic control module (PCM) in flow control mode.

Referring to FIG. 6A, the PCM is configured to direct the switching flow $F_{sw}$ toward the fourth fitting 608. The first fitting 602 is configured to receive the primary flow $F_1$ from the primary column 100 and split the primary flow $F_1$ with a portion of the primary flow $F_1$ going to a first split flow $F_{split1}$ and a portion of the primary flow $F_{1A}$ going through the second fitting 604, i.e., the portion of the primary flow $F_{1A}$ going through the second fitting 604 is equal to the primary flow $F_1$ less the first split flow $F_{split1}$: $F_{1A}=F_1-F_{split1}$. The first split flow $F_{split1}$ may be controlled by back pressure regulation or a fixed restrictor with back pressure regulation. Depending on the primary flow $F_1$ and the modulation period, the portion of the primary flow $F_{1A}$ sent through the second fitting 604 may be controlled to provide a nearly filled sample or accumulating loop 612, which is the connecting tube between the second fitting 604 and the third fitting 606. The portion of the primary flow $F_{1A}$ forms a load flow $F_{load}$ that is sent to the third fitting 606, where it mixes with a curtain flow $F_C$. The curtain flow $F_C$ is equal to the switching flow $F_{sw}$ from the PCM minus the secondary flow $F_2$, i.e., $F_C=F_{sw}-F_2$. The third fitting 606 emits an exhaust flow $F_{ex}$ that is equal to an inherent second split flow $F_{split2}$ and the load flow $F_{load}$ plus the curtain flow $F_C$, i.e., $F_{ex}=F_{load}+F_C$. The exhaust flow $F_{ex}$ may have no significant restriction through a chemical trap to the PCM for back pressure regulation. The fourth fitting 608 receives the switching flow $F_{sw}$ from the switch 610 and directs a portion of the switching flow $F_{sw}$ to the third fitting 606 as the curtain flow $F_C$ and a portion of the switching flow $F_{sw}$ to the secondary column 200 as the secondary flow $F_2$.

Referring to FIG. 6B, the PCM is configured to direct the switching flow $F_{sw}$ toward the second fitting 604. The first fitting 602 is configured to receive the primary flow $F_1$ from the primary column 100 and split the primary flow $F_1$ with a portion of the primary flow $F_1$ going to the first split flow $F_{split1}$ and a portion of the primary flow $F_{1A}$ going through the second fitting 604, i.e., the portion of the primary flow $F_{1A}$ going through the second fitting 604 is equal to the primary flow $F_1$ less the first split flow $F_{split1}$: $F_{1A}=F_1-F_{split1}$. The portion of the primary flow $F_{1A}$ and the switching flow $F_{sw}$ mix in the connecting tube 612 between the second fitting 604 and the third fitting 606 to form an inject flow $F_{inject}$. The inject flow $F_{inject}$ is equal to the switching flow $F_{sw}$ plus the portion of the primary flow $F_{1A}$, which is equal to the secondary flow $F_2$ plus the portion of the primary flow $F_{1A}$ plus the curtain flow $F_C$, i.e., $F_{inject}=F_{sw}+F_{1A}=F_2+F_{1A}+F_C$. Here, the system may experience overflush, i.e., the sample loop may be completely flushed and the inject time may be less than the column band broadening. The inject flow $F_{inject}$ is sent to the third fitting 606 where it is split with the third fitting 606 being configured to emit an exhaust flow $F_{ex}$ that is equal to an inherent second split flow $F_{split2}$, which is equal to the portion of the primary flow $F_{1A}$ plus the curtain flow $F_C$, i.e., $F_{ex}=F_{1A}+F_C$. The exhaust flow $F_{ex}$ may have no significant restriction through a chemical trap to the PCM for back pressure regulation, and the second split flow $F_{split2}$ may control the inject time. A portion of the inject flow $F_{inject}$ is sent to the fourth fitting 608 where it is sent to the secondary column 200 as the secondary flow $F_2$.

As noted above, each of the embodiments described in the detailed description above may include any of the features, options, and possibilities set out in the present disclosure figures, including those under the other independent embodiments, and may also include any combination of any of the features, options, and possibilities set out in the present disclosure and figures. Further examples consistent with the present teachings described herein are set out in the following numbered clauses:

Clause 1: A device for two-dimensional gas chromatography comprising: a primary column; a secondary column downstream from the primary column; and a re-sampling device disposed between the primary column and the secondary column, the re-sampling device including: a modulator and at least one of: a first splitter disposed upstream from the modulator and configured to split an effluent and deliver a portion of the effluent to waste and a portion of the effluent to the modulator, or a second splitter disposed downstream from the modulator and configured to split the effluent to deliver a portion of the effluent to waste and a portion of the effluent to the secondary column.

Clause 2: The device of clause 1, wherein the modulator is one of a full transfer flow modulator, a full transfer thermal modulator, a low duty cycle modulator, or a microfluidic flow modulator.

Clause 3: The device of any of clauses 1 through 2wherein the re-sampling device includes: a first accumulating loop; a second accumulating loop; a first switch configured to selectively deliver the effluent from the first splitter to one of the first accumulating loop or the second accumulating loop; and a second switch configured to selectively deliver the effluent from one of the first accumulating loop or the second accumulating loop to the second splitter.

Clause 4: The device of clause 3wherein the re-sampling device includes an auxiliary gas supply configured to flush one of the first accumulating loop or the second accumulating loop.

Clause 5: The device of clause 4wherein when the first switch and the second switch are in a first position, the auxiliary gas supply flushes the first accumulating loop, and when the first switch and the second switch are in a second position, the auxiliary gas supply flushes the second accumulating loop.

Clause 6: The device of any of clauses 4 through 5wherein a portion of the effluent from the primary column is being accumulated in the first accumulating loop while the auxiliary gas supply flushes the second accumulating loop.

Clause 7: The device of any of clauses 4 through 6wherein a portion of the effluent from the primary column is being accumulated in the second accumulating loop while the auxiliary gas supply flushes the first accumulating loop.

Clause 8: The device of any of clauses 4 through 7wherein the first accumulating loop includes a first volume and the second accumulating loop includes a second volume equal to the first volume.

Clause 9: The device of any of clauses 1 through 8wherein at least one of the first splitter or the second splitter are integrally formed with the modulator.

Clause 10: A re-sampling device for two-dimensional gas chromatography, the re-sampling device comprising: a modulator and at least one of: a first splitter disposed upstream from the modulator and configured to split an effluent from a primary column and deliver a portion of the effluent to waste and a portion of the effluent to the modulator, or a second splitter disposed downstream from the modulator and configured to split the effluent to deliver a portion of the effluent to waste and a portion of the effluent to a secondary column.

Clause 11: The re-sampling device of clause 10wherein the modulator is one of a full transfer flow modulator, a full transfer thermal modulator, a low duty cycle modulator, or a microfluidic flow modulator.

Clause 12: The re-sampling device of any of clauses 10 through 11, further comprising: a first accumulating loop; a second accumulating loop; a first switch configured to selectively deliver the effluent from the first splitter to one of the first accumulating loop or the second accumulating loop; and a second switch configured to selectively deliver the effluent from one of the first accumulating loop or the second accumulating loop to the second splitter.

Clause 13: The re-sampling device of clause 12, further comprising an auxiliary gas supply configured to flush one of the first accumulating loop or the second accumulating loop.

Clause 14: The re-sampling device of clause 13wherein when the first switch and the second switch are in a first position, the auxiliary gas supply flushes the first accumulating loop, and when the first switch and the second switch are in a second position, the auxiliary gas supply flushes the second accumulating loop.

Clause 15: The re-sampling device of any of clauses 13 through 14wherein a portion of the effluent from the primary column is being accumulated in the first accumulating loop while the auxiliary gas supply flushes the second accumulating loop.

Clause 16: The re-sampling device of any of clauses 13 through 15wherein a portion of the effluent from the primary column is being accumulated in the second accumulating loop while the auxiliary gas supply flushes the first accumulating loop.

Clause 17: The re-sampling device of any of clauses 12 through 16wherein the first accumulating loop includes a first volume and the second accumulating loop includes a second volume equal to the first volume.

Clause 18: The re-sampling device of any of clauses 10 through 17wherein the re-sampling device is implemented in a device for two-dimensional gas chromatography including a primary column and the secondary column.

Clause 19: The re-sampling device of clause 18wherein the secondary column is downstream from the primary column and the re-sampling device is disposed between the primary column and the secondary column.

Clause 20: The re-sampling device of any of clauses 10 through 19wherein at least one of the first splitter or the second splitter are integrally formed with the modulator.

A number of implementations have been described. Nevertheless, it will be understood that various modifications may be made without departing from the spirit and scope of the disclosure. Accordingly, other implementations are within the scope of the following claims.

What is claimed is:

1. A device for two-dimensional gas chromatography comprising:
   a primary column;
   a secondary column downstream from the primary column; and
   a re-sampling device disposed between the primary column and the secondary column, the re-sampling device including:
   a modulator;
   a first splitter disposed upstream from the modulator and configured to split an effluent and deliver a portion of the effluent to waste and a portion of the effluent to the modulator;
   a second splitter disposed downstream from the modulator and configured to split the effluent to deliver a portion of the effluent to waste and a portion of the effluent to the secondary column;
   a first accumulating loop;

a second accumulating loop;
a first switch configured to selectively deliver the effluent from the first splitter to one of the first accumulating loop or the second accumulating loop; and
a second switch configured to selectively deliver the effluent from the one of the first accumulating loop or the second accumulating loop to the second splitter.

2. The device of claim 1, wherein the modulator is one of a representative modulator, a representative thermal modulator, a full transfer flow modulator, a full transfer thermal modulator, a low duty cycle modulator, or a microfluidic flow modulator.

3. The device of claim 1, wherein the re-sampling device includes an auxiliary gas supply configured to flush one of the first accumulating loop or the second accumulating loop.

4. The device of claim 3, wherein when the first switch and the second switch are in a first position, the auxiliary gas supply flushes the first accumulating loop, and when the first switch and the second switch are in a second position, the auxiliary gas supply flushes the second accumulating loop.

5. The device of claim 3, wherein a portion of the effluent from the primary column is being accumulated in the first accumulating loop while the auxiliary gas supply flushes the second accumulating loop.

6. The device of claim 3, wherein a portion of the effluent from the primary column is being accumulated in the second accumulating loop while the auxiliary gas supply flushes the first accumulating loop.

7. The device of claim 3, wherein the first accumulating loop includes a first volume and the second accumulating loop includes a second volume equal to the first volume.

8. The device of claim 1, wherein at least one of the first splitter or the second splitter are integrally formed with the modulator.

9. A re-sampling device for two-dimensional gas chromatography, the re-sampling device comprising:
a modulator;
a first splitter disposed upstream from the modulator and configured to split an effluent from a primary column and deliver a portion of the effluent to waste and a portion of the effluent to the modulator;
a second splitter disposed downstream from the modulator and configured to split the effluent to deliver a portion of the effluent to waste and a portion of the effluent to a secondary column;
a first accumulating loop;
a second accumulating loop;
a first switch configured to selectively deliver the effluent from the first splitter to one of the first accumulating loop or the second accumulating loop; and
a second switch configured to selectively deliver the effluent from the one of the first accumulating loop or the second accumulating loop to the second splitter.

10. The re-sampling device of claim 9, wherein the modulator is one of a representative modulator, a representative thermal modulator, a full transfer flow modulator, a full transfer thermal modulator, a low duty cycle modulator, or a microfluidic flow modulator.

11. The re-sampling device of claim 9, further comprising an auxiliary gas supply configured to flush one of the first accumulating loop or the second accumulating loop.

12. The re-sampling device of claim 11, wherein when the first switch and the second switch are in a first position, the auxiliary gas supply flushes the first accumulating loop, and when the first switch and the second switch are in a second position, the auxiliary gas supply flushes the second accumulating loop.

13. The re-sampling device of claim 11, wherein a portion of the effluent from the primary column is being accumulated in the first accumulating loop while the auxiliary gas supply flushes the second accumulating loop.

14. The re-sampling device of claim 11, wherein a portion of the effluent from the primary column is being accumulated in the second accumulating loop while the auxiliary gas supply flushes the first accumulating loop.

15. The re-sampling device of claim 9, wherein the first accumulating loop includes a first volume and the second accumulating loop includes a second volume equal to the first volume.

16. The re-sampling device of claim 9, wherein the re-sampling device is implemented in a device for two-dimensional gas chromatography including a primary column and the secondary column.

17. The re-sampling device of claim 16, wherein the secondary column is downstream from the primary column and the re-sampling device is disposed between the primary column and the secondary column.

18. The re-sampling device of claim 9, wherein at least one of the first splitter or the second splitter are integrally formed with the modulator.

* * * * *